United States Patent [19]

Higgins, Jr.

[11] Patent Number: 5,355,524
[45] Date of Patent: Oct. 11, 1994

[54] INTEGRATED RADIO RECEIVER/TRANSMITTER STRUCTURE

[75] Inventor: Robert J. Higgins, Jr., Plantation, Fla.

[73] Assignee: Motorola, Inc., Schaumburg, Ill.

[21] Appl. No.: 822,809

[22] Filed: Jan. 21, 1992

[51] Int. Cl.⁵ ............................................. H04B 1/44
[52] U.S. Cl. ........................................ 455/82; 455/86; 455/90; 333/204
[58] Field of Search ................... 455/78, 79, 82-84, 455/86, 89-90, 76, 302, 307, 333; 333/204

[56] References Cited

U.S. PATENT DOCUMENTS

| | | |
|---|---|---|
| 4,476,575 | 10/1984 | Franke et al. ............ 455/76 |
| 4,609,892 | 9/1986 | Higgins, Jr. ............... 333/204 |
| 4,903,257 | 2/1990 | Takeda et al. .......... 455/86 X |
| 4,907,291 | 3/1990 | Yamamoto ............. 455/87 X |
| 4,972,455 | 11/1990 | Phillips et al. ......... 455/76 X |
| 5,020,148 | 5/1991 | Bonato ..................... 455/302 |
| 5,083,236 | 1/1992 | Chason et al. ......... 333/204 X |
| 5,157,364 | 10/1992 | Pond et al. ............ 333/204 X |

*Primary Examiner*—Edward F. Urban
*Attorney, Agent, or Firm*—Pedro P. Hernandez

[57] ABSTRACT

A single chip receiver/transmitter section (202) includes an antenna switch (208), a low noise amplifier (210), a power amplifier (212) and a first (214) and second (216) mixers. The antenna switch (206) includes an antenna terminal (256) which is coupled to an off-chip band pass filter (206) which provides all of the selectivity for radio (200). Also described is a transmitter/receiver structure (300) which incorporates a transmission line filter such as band pass filter (206) formed by substrates (304) and (306) and includes the single chip transmitter/receiver section (202) imbedded inside of the structure (300).

2 Claims, 3 Drawing Sheets

INTEGRATED RADIO RECEIVER/TRANSMITTER STRUCTURE

TECHNICAL FIELD

This invention relates generally to a two way radio architecture, and more specifically to a radio architecture which allows more of the active circuitry to be integrated.

BACKGROUND

Conventional two-way time division multiplex (TDM) radio architectures have several interstitial radio frequency (RF) filters in both the transmitter and receiver sections of the radio. In FIG. 1, there is shown a prior art TDM radio 100. Radio 100, includes a bandpass filter (BPF) 102, located in the receiver section of radio 100. The input terminal of filter 102 is electrically coupled to a conventional antenna switch 104. The output terminal of filter 102 is in turn coupled to a low noise amplifier (LNA) 106 used for amplifying the received radio frequency signal. The low noise amplifier 106 is followed by another bandpass filter 108 in order to further filter the received signal. The output of filter 108 is coupled to mixer 110 where the received signal is mixed with the first injection signal 120 coming from synthesizer 122. The resulting IF signal is then passed through another bandpass filter 124 prior to the filtered IF signal being sent to the receiver back-end circuitry 128 in order to gather the desired receiver component coming from mixer 110.

The transmitter section of radio 100 includes a second LO (local oscillator) signal 126 which is produced by the transmitter front-end (not shown) and which is mixed by mixer 130 with the 1st injection signal 120. The output signal of mixer 130 is then sent to a band pass filter 112, which is typically located at the input to the transmitter power amplifier 114, in order to gather the desired transmitter component coming from mixer 130. Finally, a low pass filter 116, is coupled to the output of the power amplifier 114 in order to further filter the RF signal prior to the RF signal being sent to antenna 118.

Two consecutive radio blocks (e.g., LNA 106, T/R switch 104, etc.) cannot be easily integrated if they have an "off-chip" filter between them (filters 102, 108, 112 and 116). This is because doing so would cause the "off-chip" filter to lose much of its selectivity characteristics due to the stray electric and inductive coupling created by the large physical size of the interconnecting wires of the "off-chip" filter, as compared to the size of the integrated section (IC) to which the filter is being coupled. Trying to provide an "off-chip" filter between integrated blocks would defeat the purpose of integrating any portion of the R.F. section at all. Thus, contemporary Time Division Multiplexed (TDM) radios have the R.F. sections of the radios comprised of many lumped or small scale integrated blocks with filters coupled between the blocks.

A need thus exists for a radio architecture which can be integrated more easily. The improved integration can provide for substantial size and cost reductions to the final radio product.

SUMMARY OF THE INVENTION

Briefly, according to the invention, a single integrated chip radio receiver/transmitter section, comprises an antenna switch having an antenna port, a receive signal output port, and a transmit signal input port. Also included in the radio is an amplifier having an input and output terminal, the amplifier input terminal is coupled to the antenna switch receive signal output port. Further included is a first mixer means having first and second input terminals and an output terminal. The amplifier output terminal is coupled to the first input terminal of the first mixer means. A second mixer means, having first and second input terminals and an output terminal, is also included. The second input terminals of the first and second mixer means are coupled together for receiving an injection signal. Finally, a power amplifier having an input and output port is included in the radio. The input port of the power amplifier is coupled to the output terminal of the second mixer means and the output port of the power amplifier is coupled to the transmit signal input port of the antenna switch. In another aspect of the present invention a receiver/transmitter structure is disclosed. In still another aspect of the present invention a radio having an integrated radio architecture includes a single chip transmitter/receiver section and an off-chip filter.

DETAILED DESCRIPTION OF THE PREFERRED EMBODIMENT

Figure 1:
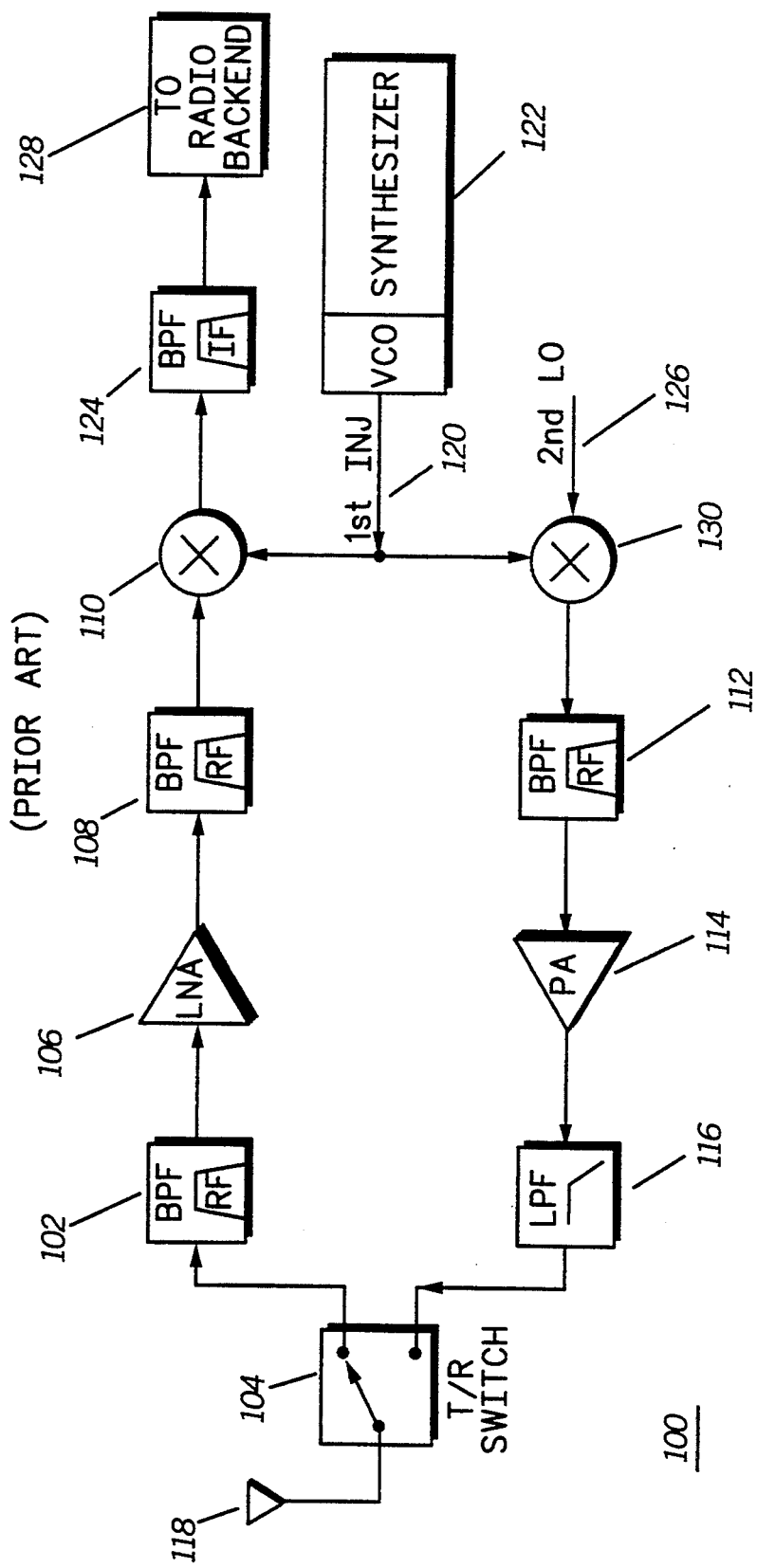
FIG. 1 is a simplified block diagram of a prior art radio.
Figure 2:
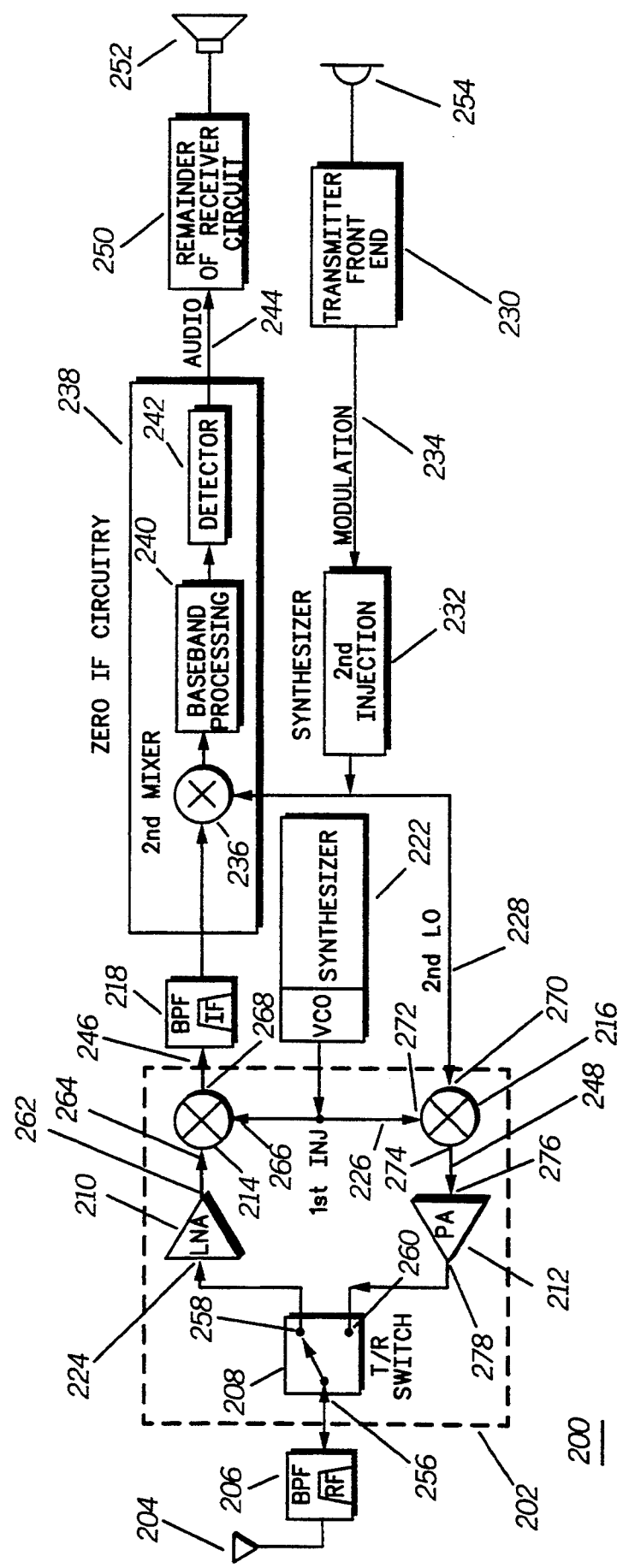
FIG. 2 is a simplified block diagram of a radio architecture in accordance with the present invention.

Referring now to the drawings and in particular to FIG. 2, there is shown a block diagram of a radio 200 utilizing the architecture of the present invention. Radio 200 has a much greater compatibility with integrated circuit (IC) technology and offers the advantage of putting the entire active RF section in one IC die, as compared to the conventional radio architecture shown in FIG. 1. Radio 200 is preferably a TDM radio utilizing a zero I.F. radio back-end. Antenna 204 is coupled to a "low-loss" bandpass filter 206. The need for filter 206 to be "low-loss" will be evident as the radio architecture is further described. Filter 206 is used for both the transmit and receive modes of radio 200. Coupled to low-loss filter 206, is transmit/receive or antenna switch 208, which is part of the integrated radio section 202. Antenna switch 208 is preferably an easily integratable Gallium Arsenide (GaAs) FET switch as known in the art. Antenna switch 208, can also take the form of a circulator or duplexer as required by the radio design. Antenna switch 208 includes an antenna port 256, a receive signal output port 258 and a transmit signal input port 260. The upper section of integrated section 202 is the receive section or receive string, while the bottom section is the transmit section or transmit string of radio 200.

Conventionally, as shown in FIG. 1, a bandpass filter such as filter 108 is placed between a low noise amplifier 106 and the first receiver mixer 110 for two main reasons. First, any loss in the bandpass filter 108 will have less effect on the overall noise figure of the receiver due to the gain attributed to the low-noise amplifier (LNA) 106. Secondly, ignoring the image signal which must be removed, there is still amplified thermal noise at the image frequency which will degrade the noise figure of the LNA 106 and mixer 110 by 3 dB if it is not removed; both of which have an impact on the overall receiver noise figure.

The present invention deals with the two problems mentioned above by first, removing the bandpass filter (filter 108 of FIG. 1) which is between low-noise amplifier 106 and mixer 110. Therefore, the input terminal 224 of LNA 210 is now coupled to the receive signal output port of antenna switch 208, while the output terminal 262 of LNA 210 is directly coupled to the first input terminal of first mixer means or mixer 214. By not having a filter between LNA 210 and mixer 214, the system noise floor will be offset by 3 dB (if an image rejection mixer is not used for mixer 214). As seen from the input 224 of LNA 210, the system noise floor will begin at a level of 3 dB.

For example, if we assume that we are using a LNA (low-noise amplifier) 210 having a gain of 10 dB and having a noise figure of 3 dB, and that we are still are using a filter (such as band pass filter (BPF) 108 of FIG. 1, between the LNA 210 and mixer 218) and also that mixer 214 has a noise figure of 5 dB and the band bass filter filter has a 3 dB loss factor, in order to remove the image noise, the system noise figure will equal:

$$F_{sys} = 10\log\left[2 + \frac{10^{\frac{3\,db}{10}} - 1}{10} + \frac{10^{\frac{5\,db}{10}} - 1}{(10)\left(10^{\frac{-3\,db}{10}}\right)}\right]$$

$F_{sys}$=4.03 dB with mixer image selectivity.

For the case as shown in FIG. 2, where no filter is used to eliminate the image noise, the system noise figure is equal to:

$$F_{sys} = 10\log\left[2 + 2 + \frac{10^{\frac{5\,dB}{10}} - 1}{10}\right] = 6.25 \text{ dB without mixer}$$

image selectivity.

As been shown above, the system noise figure ($F_{sys}$) only worsened by 2.2 dB by not utilizing the filter between the output of LNA 210 and mixer 214 (such as filter 108 in FIG. 1). Using a low-loss filter such as filter 206 before the input to the LNA as shown in FIG. 2, requires that the low-loss filter 206 have at least 2.2 dB less insertion loss while still providing all of the selectivity needed at the image to maintain the same sensitivity specification for the receiver.

Typical front end filters have a loss factor of approximately 3–4 dB. This must be improved to at least 2.2 dB to make up the loss in system noise figure previously discussed. This is assuming all of the loss is to be made up by filter 206 alone. If image balancing is used by mixer 214, the system selectivity and sensitivity can be regained. Also, since many of the Time-Division Multiplexing (TDM) products being built today have low receiver specification levels for image selectivity (typically in the range of 40–50 dB), realizing the low-loss level in filter 206 will not be difficult from the standpoint of receiver constraints. If image balancing (also known in the art as single sideband mixing, image suppression mixing and image separation mixing) is used by mixer 214, the possibility of achieving higher operating specifications can be achieved. If higher radio specification levels are required, a change in filter technology for filter 206 as known in the art will be required in order achieve the greater selectivity at the same low loss level that will be required.

The IF (intermediate frequency) output signal 246 coming from the output terminal 268 of mixer 214 is coupled to a bandpass filter 218 which is in turn coupled to a conventional zero IF circuit 238. Zero IF circuit 238 comprises a second mixer 236 followed by a baseband processing block 240 and a detector circuit 242. The audio output 244 from zero IF circuit 238 is then sent to the remaining receiver circuits 250 (e.g., audio amplifier, etc.) for presentation to speaker 252 (in the case of data, the data would be sent to a controller which is not shown for further processing).

In the transmitter string of FIG. 2, a microphone 254 is coupled to a conventional transmitter front end 230 for audio signal amplification and processing. The modulating signal 234 is then coupled to the second injection synthesizer 232 for modulation of the second injection synthesizer signal; thus providing a modulated signal at the second local oscillator (LO) frequency 228 to mixer 216. Modulation can instead be applied to the first injection synthesizer, but this tends to prove more difficult.

In the transmitter side of FIG. 2, two significant issues are present with the use of the present invention. First, the second mixer means or transmit mixer 216 which can be a balanced mixer, generates a spurious mixer product equally spaced around the RF carrier. For example, if the first injection signal (first reference signal) 226 coming from synthesizer 222 is placed at the second input terminal of mixer 216 was 1800 MHz and the second LO signal (second reference signal) 228 placed at the first input terminal 270 was 100 MHz, when mixed, output signals 248 would be produced at output terminal 274 at 1700 MHz and 1900 MHz, both signals having approximately equal amplitudes. In a conventional transmitter, the desired transmitter component is selected using a bandpass filter after the mixer. Such as bandpass filter 112 shown on FIG. 1. This is required in order to reject the undesired signal (mixer product) before the signal is sent to the transmitter power amplifier 114 (power amplifier input port 276) in order to prevent intermodulation and ensure reasonable efficiency and power output specifications at output port 278.

The second major issue confronted when using the radio architecture of FIG. 2 is that low-loss filter 206 is placed between the transmitter power amplifier 212 and antenna 204 and its loss level will directly reduce the output at the high transmitter power level. Loss in filter 206 directly degrades the efficiency of the DC to RF conversion process of the transmitter string of radio 200. For most radio applications, this will force the insertion loss of the low-loss filter 206 to be approximately below 1.5 dB. Fortunately, most modern TDM radios have low average transmit power levels, and thus, the transmitter efficiency will have somewhat less of an effect on the overall radio battery capacity size requirement.

To address the first problem associated with the transmitter string of radio 200, an image suppression mixer (also known as single sideband mixer, image separation mixer, etc.) will preferably be used for mixer 216. An image suppression mixer 216 requires more elements than a simple balanced mixer. Mixer 216 preferably requires no more than 10–15 dB of image suppression. A mixer such as that described in U.S. Pat. No. 5,214,796 and entitled "Image Separation Mixer" by Gregory J. Gorrie, et al. is hereby incorporated by reference can be used for mixer 216. Achieving the low filter loss (<1.5 dB) in "low-loss" filter 206 can be addressed by using a filter of the necessary physical volume to get the requisite unloaded Q ($Q_U$) in its constituent resonators as known in the art. This is addressable simply by design. As was shown in FIG. 2, radio section 202 can now be easily integrated in order to reduce size and cost over prior art radio architectures.

Figure 3:
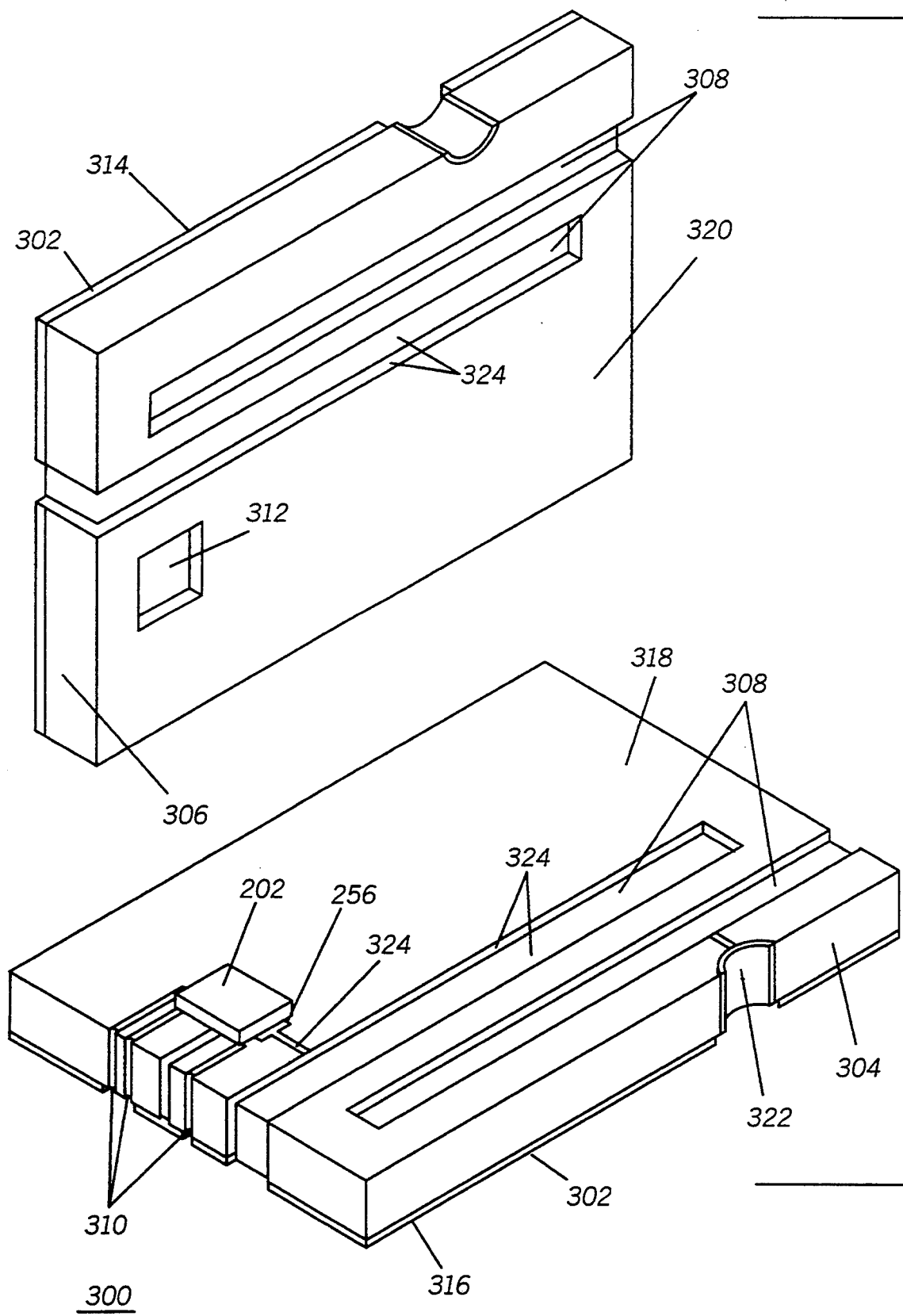
FIG. 3 shows a transmitter/receiver structure containing a single chip transmitter/receiver section within the structure, in accordance with the present invention.

In FIG. 3, there is shown one way of implementing the present invention using a receiver/transmitter structure 300 containing integrated radio section 202. Structure 300 implements band-pass filter 206 using stripline sections 304 and 306, thereby implementing the radio band-bass selectivity filter 206 and the integrated radio section 202, which is in the form of an IC die attached to the stripline, in one self contained receiver/transmitter structure 300. Structure 300 preferably takes the form of a ceramic transmission line structure with an embedded IC die which contains the components in integrated radio section 202. U.S. Pat. Nos. 4,609,892 and 4,785,271, entitled "Stripline Filter Apparatus And Method Of Making The Same" and "Stripline Filter With Improved Resonator Structure", respectively, by Robert J. Higgins Jr., both teach how to build a stripline filter and are both hereby incorporated by reference as if fully set forth in this paper.

Both stripline substrates 304 and 306 have ground planes 302 in their outer or first surfaces 314 and 316, as well as a conductive resonator means such as conductive runners 308 in their inner or second surfaces 318 and 320 which form transmission lines. In the preferred embodiment the conductive runners 308 are grooves in the ceramic block which have their walls 324 metallized. The only portion of the inner surfaces 318 and 320 which are metallized are the groove walls 324 which form the conductive runners 308. The conductive resonator means 308 cooperates with ground planes 302 to form a stripline filter such as filter 206. Conductive resonator means 308 has a first terminal 322 which is coupled to the radio antenna (not shown) and a second terminal 324 which attaches to the antenna port of antenna switch 208 which is part of integrated section (IC) 202. Integrated section 202 has several inputs and outputs 310 coming in and out of the stripline structure 300 for interfacing to the back-end of the radio receiver and the front-end of the radio transmitter (2nd LO signal 228). These inputs and outputs 310 are isolated from ground planes 302. A recess or pocket 312 is located in substrate 306 which allows substrates 304 and 306 to be soldered together with both second surfaces 318 and 320 thereby forming the stripline filter.

In summary, the present invention provides for radio R.F. sections such that the R.F. selectivity can be condensed into one off-chip filter 206 outside the bulk of the remaining R.F. circuitry. The new architecture thus presents a vastly improved opportunity to integrate onto one die, all of the transmit and receive R.F. circuitry. All of the active components for low power consumption radio can be integrated onto one GaAs (gallium arsenide) die 202. The entire RF section can thus be built into one "integrated stripline" module such as shown in FIG. 3. Having the RF section reduced to fewer components promotes commonality and substantially reduces the overall cost of producing a radio.

What is claimed is:

1. An integrated radio receiver/transmitter structure, comprising:

a first dielectric substrate having first and second opposed surfaces, the first dielectric substrate having a ground plane on the first surface and a conductive resonator on the second surface, the conductive resonator having first and second terminals;

a second dielectric substrate having first and second opposed surfaces, the second dielectric substrate having a ground plane on the first surface, the second surfaces of both dielectric substrates being attached to each other, the first and second dielectric substrates forming a bandpass filter; and a single integrated circuit chip transmitter/receiver section attached to the second surface of the first dielectric substrate, the single chip transmitter/receiver section comprising:

an antenna switch having an antenna port, a receive signal output port and a transmit signal input port, the antenna port is coupled to the second terminal of the conductive resonator;

an amplifier having an input and output terminal, the amplifier input terminal being coupled to the antenna switch receive signal output port;

a first mixer means having first and second input terminals and an output terminal, the amplifier output terminal being coupled to the first input terminal of the first mixer means;

a second mixer means having first and second input terminals and an output terminal, the second input terminals of the first and second mixer means being coupled together for receiving a first reference signal; and a power amplifier having an input and output port the input port of the power amplifier is coupled to the output terminal of the second mixer means and the output port of the power amplifier being coupled to the transmit signal input port of the antenna switch.

2. The receiver/transmitter structure of claim 1, wherein the second dielectric substrate includes a recess in the second surface for receiving the single chip transmitter/receiver section.

* * * * *